Feb. 2, 1960     J. L. NEWMAN     2,923,084
FLOATING SPOON
Filed Jan. 14, 1957
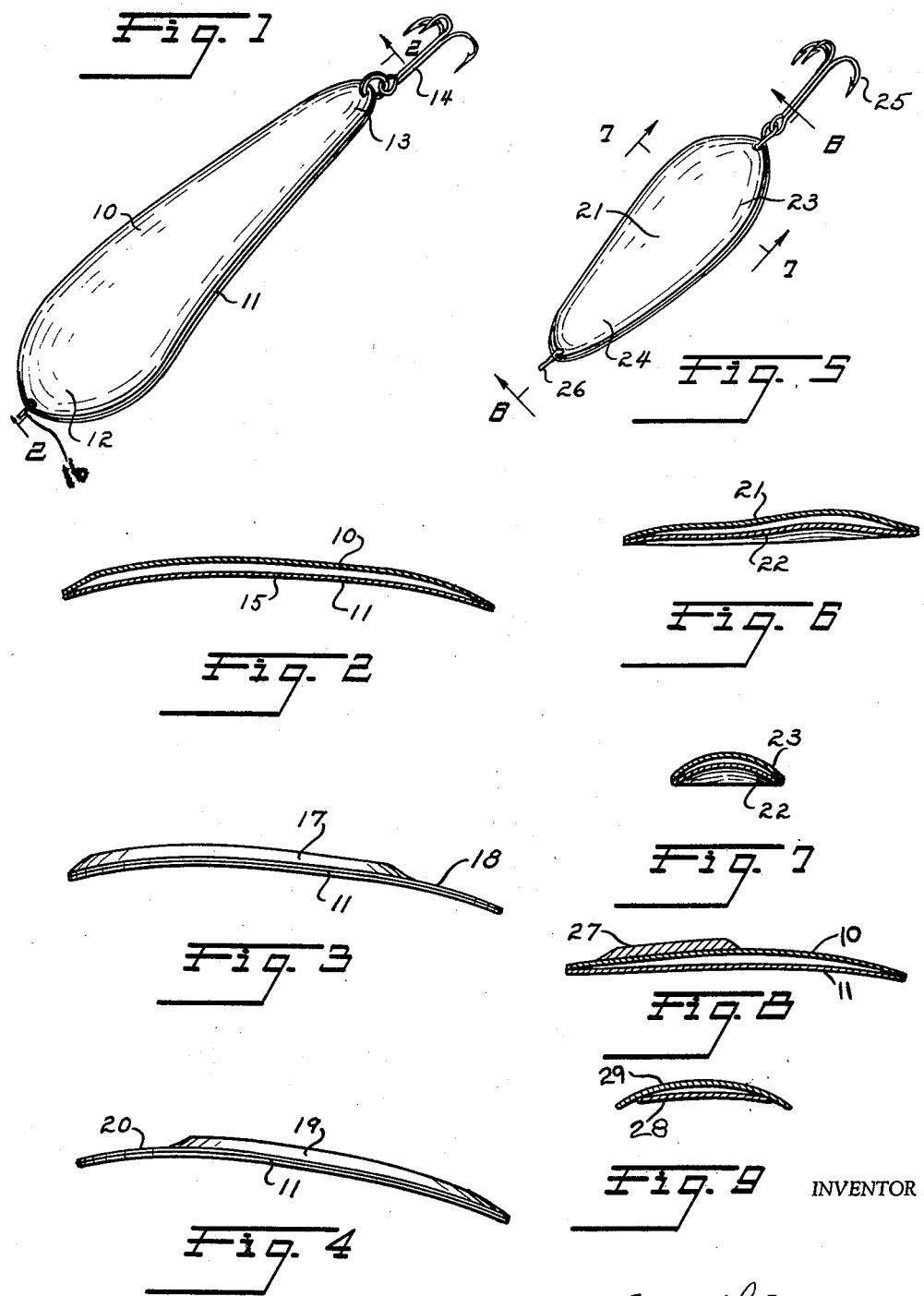
INVENTOR
James L. Newman

United States Patent Office 2,923,084
Patented Feb. 2, 1960

2,923,084

FLOATING SPOON

James L. Newman, Barboursville, W. Va.

Application January 14, 1957, Serial No. 634,071

8 Claims. (Cl. 43—42.35)

This invention relates to fishing lures and has special application to a fishing spoon.

One object of the invention is to provide a novel form of spoon lure provided with flotation means adapted to keep the spoon floating on top of or close to the surface of the water in which the spoon is being used.

A second important object of the invention is to provide a form of spoon lure which will travel smoothly over or through the upper part of a body of water which is being fished, however, the motion is not necessarily to be in a straight line.

A third important object of this invention is to provide a modified form of such hollow spoon lure so shaped as to have a slight up and down movement as it is drawn by a fish line while in use.

A fourth important object of this invention is to provide modified forms of hollow spoons so shaped as to simulate the movements of an injured minnow when endeavoring to avoid being caught by a pursuing fish, in that when drawn by a line, the spoon tends to dive with a side to side lateral motion, and when tension on the line is released, the lure returns to the top of the water as would a minnow which was unable to dive or sink in the water due to injuries.

A fifth object of this invention is to provide a novel form of hollow spoon shaped and constructed to produce a skipping action as it is drawn over the surface of a body of water being fished, as when trolled behind a boat, a skittering action is produced similar to that of a bait fish when trolled on the surface.

With the above and other objects in view, as will presently be apparent, the invention consists in general of a fishing spoon provided with flotation means and constructed and shaped to have great attraction for fish, the lure being of forms hereinafter described, illustrated in the accompanying drawings, and particularly claimed.

In the accompanying drawings, like characters of reference indicate like parts in the several views, and:

Fig. 1 is a perspective view of one form of the invention.

Fig. 2 is a vertical section taken on the longitudinal plane 2—2 of Fig. 1.

Fig. 3 is a side elevation disclosing one form of the spoon shaped to simulate a wounded minnow.

Fig. 4 is a side elevation disclosing a second form simulating an injured minnow.

Fig. 5 is a perspective view of a variation of the spoon shown in Fig. 1.

Fig. 6 is a section on the line 6—6 of Fig. 5.

Fig. 7 is a section on the line 7—7 of Fig. 5.

Fig. 8 is a section showing a modification of Fig. 1 whereby the spoon travels over the water surface with a skipping movement.

Fig. 9 is a modified cross sectional view of Fig. 5.

In the form of the device as shown in Figures 1 and 2, the spoon is formed of two layers of very thin metal, there being an upper layer 10 and a lower layer 11. Both of these layers are of the same peripheral form and size, being wider at the rounded forward end 12 than at the narrow rear end 13 to which a hook 14 is attached. Each dished shape portion of the layers is quite shallow in depth; but the layer 10 is more deeply bowed upward than the layer 11, thus forming a sort of blister. The two layers have their peripheries brought together, and there held fixedly by welding or other suitable means. The difference of the upward bowing of the two layers will be seen from Fig. 2 to provide an air space between the layers, which, in all forms of the invention, constitutes the flotation means of the spoons. In the construction as shown in Figures 1 and 2, the spoon, when drawn by a fish line 16, will travel on or close to the surface of the water being fished in a wriggling or erratic manner with the smooth and even motions of a live fish.

In the form of the spoon shown in Fig. 3, the upper layer shown at 17 has its rear end somewhat flattened, as at 18, to engage a considerable area of the smaller end of the lower layer 11. In the form of Fig. 4, the forward and wider end of the upper layer 19 is somewhat flattened and closely engaged on the lower layer 11, as at 20.

In both of the forms shown in Figures 3 and 4, the action of a wounded minnow is imitated both because of the dished shape of the spoon and because the center of buoyancy is spaced from the center of gravity of the spoon. As the spoon is drawn through the water it takes an erratic motion up and down and from one side to the other.

In the form shown in Figs. 5, 6, and 7, there is provided an upper layer 21, and a lower layer 22, of the same peripheral shape and size. These layers have dome shaped wide rear ends 23, and front narrow ends 24, which are nearly flat longitudinally while transversely arcuate to a slight extent. A hook 25 is carried by the wide end, and a fish line 26 is attached to the narrow end. This form will also have a somewhat erratic movement, which, it is found, quickly attracts the attention of a hungry fish.

In Fig. 8, a spoon of the same construction as in Figs. 1 and 2 is provided, with a weight 27 on the upper layer 10 which changes the center of gravity and causes the spoon to travel in an inverted position and to skip over the surface of the water.

Fig. 9 shows a modified cross sectional view of the type of spoon shown in Figure 5. The lower layer 28 has a smaller periphery than the upper layer 29, and is affixed to the upper layer 29 to form a hollow air chamber. The shape of the lower layer 28 has been modified to lie wholly within the periphery of the upper layer 29 in any of the various forms of dome shaped spoon structures.

As illustrated and fully described, it is apparent that in each form of the invention the spoon is formed of two dished layers in which the bowl of one layer is deeper than the bowl of the other layer, thereby providing for an air space between the layers.

There has thus been provided simple and efficient means of the kind described and for the purpose. It is to be understood, however, that the invention is not restricted to such forms as are herein shown in the drawings and described in the specification, but it is to be understood to include all forms which come within the scope of the appended claims.

What is claimed is:

1. A fishing lure comprising a spoon formed of two nested dished layers of sheet material joined along their entire peripheries to form an integral unit, and spaced within their peripheries to form an air tight air pocket of the same general shape as said two layers.

2. A fishing lure comprising a spoon formed of two dished layers of sheet material of like peripheries nested one within the other joined along their entire peripheries to form an integral unit and spaced within their peripheries to form an air pocker to provide limited buoyancy.

3. The spoon of claim 2, wherein each layer is provided with a semi-circular wide end and a semi-circular small end, the two surfaces of the layers at the said wide end conforming in form and curvature, said conforming portions being in surface to surface contact and the remainder of said dished layers being spaced except at their edges to form said air pocket whereby the center of buoyancy is not adjacent the center of gravity of the spoon so that the spoon in use closely simulates the action of a wounded fish.

4. A fishing lure comprising a spoon formed of two nested layers of domed sheet material of similar outline but of different dimension, the inner of the two nested layers being the smaller in dimension but having greater radii of doming than the outer said layer, said smaller said layer being joined along its entire periphery to the concave side of said larger layer to form an integral unit, whereby said layers are spaced, within the periphery of said smaller layer to form an air tight pocket.

5. The spoon of claim 2, wherein the peripheral portions of the layers form a knife edge extending completely around the spoon.

6. The spoon of claim 1, wherein the spacing at one end between the layers, is of dome shape and greater than the remainder of the spacing between the layers.

7. The spoon of claim 1, wherein the convex side of said integral unit is provided with a weight mounted thereon whereby, when in use, the convex weighted layer lies beneath the other layer.

8. The spoon of claim 1, wherein one of the layers is provided with a weight mounted thereon whereby, when in use, the weighted layer lies beneath the other layer.

References Cited in the file of this patent

UNITED STATES PATENTS

| | | |
|---|---|---|
| D. 139,655 | Jorgensen | Dec. 5, 1944 |
| 849,367 | Burke | Apr. 9, 1907 |
| 1,272,003 | Cameron | July 9, 1918 |
| 1,608,375 | Dewey | Nov. 23, 1926 |
| 1,817,694 | Lafky | Aug. 4, 1931 |
| 2,186,780 | De Witt | Jan. 9, 1940 |
| 2,632,276 | Hale | Mar. 24, 1953 |
| 2,633,659 | Baum | Apr. 7, 1953 |
| 2,645,052 | Schiller | July 14, 1953 |